US00RE44184E

(19) United States
(12) Reissued Patent
Greer et al.

(10) Patent Number: US RE44,184 E
(45) Date of Reissued Patent: Apr. 30, 2013

(54) PREFORMED THERMOPLASTIC INDICIA FOR AIRPORT RUNWAYS AND TAXIWAYS

(76) Inventors: Robert W. Greer, Lexington, NC (US); Alexander F. Cady, Greensboro, NC (US)

(21) Appl. No.: 13/536,122

(22) Filed: Jun. 28, 2012

Related U.S. Patent Documents

Reissue of:
(64) Patent No.: 7,744,306
Issued: Jun. 29, 2010
Appl. No.: 11/732,056
Filed: Apr. 2, 2007

(51) Int. Cl.
*E01C 5/20* (2006.01)

(52) U.S. Cl.
USPC ..... 424/73; 404/75; 404/94

(58) Field of Classification Search ..... 404/12–16, 404/73, 75, 93, 94
See application file for complete search history.

(56) References Cited

U.S. PATENT DOCUMENTS

| | | | | | |
|---|---|---|---|---|---|
| 3,293,094 | A * | 12/1966 | Nairn et al. | 156/79 |
| 3,935,158 | A * | 1/1976 | Watanabe | 523/172 |
| 4,028,118 | A * | 6/1977 | Nakasuji et al. | 106/31.19 |
| 4,031,048 | A * | 6/1977 | Holmen et al. | 523/172 |
| 4,188,437 | A * | 2/1980 | Rohowetz | 428/199 |
| 4,236,950 | A * | 12/1980 | Eigenmann | 156/71 |
| 4,301,050 | A * | 11/1981 | Masuda et al. | 523/172 |
| 4,490,432 | A * | 12/1984 | Jordan | 428/220 |
| 4,671,699 | A * | 6/1987 | Roach | 404/41 |
| 4,761,699 | A * | 8/1988 | Ainslie et al. | 360/234.5 |
| 5,288,163 | A | 2/1994 | Munson | |
| 5,352,649 | A * | 10/1994 | Shibahashi et al. | 503/207 |
| 5,750,191 | A * | 5/1998 | Hachey et al. | 427/163.4 |
| 5,861,206 | A * | 1/1999 | Jensen | 428/143 |
| 6,299,944 | B1 * | 10/2001 | Trapani | 427/493 |
| 6,783,584 | B2 * | 8/2004 | Takahashi | 106/403 |
| 7,524,910 | B2 * | 4/2009 | Jiang et al. | 526/348 |
| 2003/0070579 | A1 | 4/2003 | Hong et al. | |
| 2003/0222247 | A1 * | 12/2003 | Putman et al. | 252/301.36 |
| 2004/0058095 | A1 | 3/2004 | Carr et al. | |

FOREIGN PATENT DOCUMENTS

| | | | |
|---|---|---|---|
| JP | 11209909 | A2 | 8/1999 |
| WO | WO9828372 | A1 | 7/1998 |

* cited by examiner

*Primary Examiner* — Raymond W Addie
(74) *Attorney, Agent, or Firm* — Guerry L. Grune; ePatentManager.com

(57) ABSTRACT

Disclosed is an alkyd resin-based pre-manufactured thermoplastic airport runway signage that is applied in relatively large sections onto an airport runway. The pre-manufactured preformed thermoplastic formed as a continuous sheet and wound onto a take-up spool. The runway surface is prepared with [a CCS] *an* epoxy primer and the preformed thermoplastic is unwound from the take-up spool and positioned onto the runway surface. When the pre-manufactured thermoplastic signage is in a desired location it is initially rolled conforming to the runway surface. Heat is applied to the rolled surface to a preferred temperature with an infra-red (IR) heater to melt and adhere the pre-manufactured thermoplastic signage into the runway surface.

17 Claims, 1 Drawing Sheet

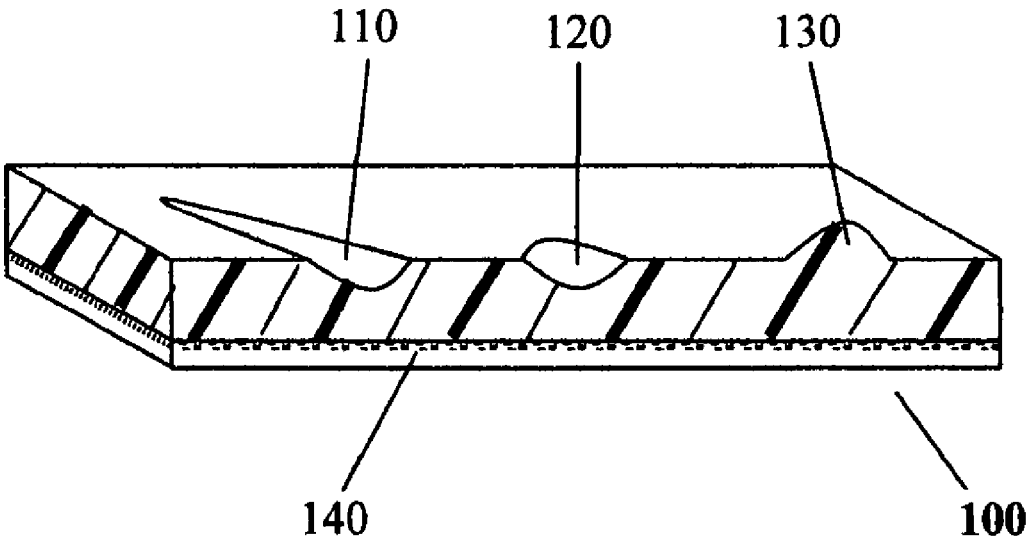
110
120
130
140
100

PREFORMED THERMOPLASTIC INDICIA FOR AIRPORT RUNWAYS AND TAXIWAYS

Matter enclosed in heavy brackets [ ] appears in the original patent but forms no part of this reissue specification; matter printed in italics indicates the additions made by reissue.

*CROSS-REFERENCE TO RELATED APPLICATION*

*The present application is a reissue of U.S. Pat. No. 7,744,306 B2, granted Jun. 29, 2010 entitled, "Preformed Thermoplastic Indicia for Airport Runways and Taxiways."*

FIELD OF INVENTION

The present invention relates to preformed thermoplastic surface guidance indicia that are applied to runways and taxiways to convey information to aircraft and aircraft support operators.

BACKGROUND OF INVENTION

Airport pavement indicia and signs provide information that is useful to a pilot during takeoff, landing, and taxiing. Generally airport indicia are grouped into four categories: runway indicia, taxiway indicia, holding position indicia, and other indicia. Indicia for runways are white. Indicia for taxiways, areas not intended for use by aircraft (closed and hazardous areas), and holding positions (even if they are on a runway) are yellow. Indicia for heliports are white with the exception of medical helicopter areas which are white with a red cross.

Presently much of the runway and taxiway information is painted onto the concrete or asphalt. This paint may last for several weeks or several months depending on the amount of use, the size of the aircraft traffic using it and/or severity of environmental conditions.

It has been found that uniformity in airport indicia and signs from one airport to another enhances safety and improves efficiency. FAA Standards AC 150/5340-1 "Standards for Airport Indicia" and AC 150/5340-18 "Standards for Airport Sign Systems" are both references that define the minimum requirements for airport indicia and signage. Non-maintenance of painted indicia may allow indicia to become deteriorated to a point where the information being conveyed is confusing or illegible.

Runway indicia may also be divided into the following groups: visual runway indicia, non-precision instrument indicia and precision instrument indicia. Additional indicia are required for runway lengths over 4000 feet and for runways serving international commercial transports.

Maintenance of the painted surfaces require that runways and taxiways be shut down while the surface is prepared, paint applied and for curing time. Maintenance of a particular runway may impact the holding and taxiways of adjacent or intersecting pavement. The pavement warnings of adjacent or intersecting pavement must change to denote changes in holding areas, and thresholds to avoid ground collisions with other aircraft.

Presently many airports have allocated budgets for painting the warning, identification and directional indicia. Painting the runway surfaces is performed on a rotational basis of about every three weeks depending on the volume and size of the aircraft traffic. Although the painting of the runway surface is relatively quick, the runway traffic needs to be rerouted to other runways causing flight delays while the painting and drying of the painting occurs. It also is expensive in that full time painting crews are continually rotating from runway to runway.

Ground safety remains a problem at busy airports across the United States and the world. The movement of aircraft in and around busy airports along taxiways between terminal gates and runways presents numerous opportunities for runway incursions, particularly when visibility is poor. A runway incursion is the entry of an aircraft without clearance onto an active runway from an adjacent ramp or taxiway, for which there is a great deal of risk of collision with a landing or departing aircraft. Incursions are often the inadvertent result of pilot disorientation caused by poor visibility.

As recently as Aug. 26, 2006, Comair Flight 5191 crashed about half a mile past the end of a runway at the Lexington, Ky. airport, killing 49 of the 50 people onboard. The plane took off on runway 26, not runway 22 where it was assigned. It was an early morning flight with overcast skies and a slight rain. The NTSB probe is focusing their investigation on recent construction work at the Lexington airport, lighting and the indicia on the taxiways and runways.

This does not include incidents such as taxiway collisions or near misses resulting from vehicle operators mistaking one taxiway for another. Runway incursions and other taxiway incidents can still represent inconvenience and expense even when a ground collision does not result. To return an aircraft to a path from which it has strayed requires a considerable expenditure of time and fuel, and a compromise to the safety of all involved.

Therefore, there is a need for runway signage that is relatively quick to apply that will exhibit exceptional wear characteristics, allow for delaying intervening scheduled maintenance, and assist with reduction of the cost of maintenance, inconvenience of delayed flights and confusion due to runway rerouting.

DESCRIPTION OF PRIOR ART

U.S. Patent Publication No. 2004/0058095A1 to Carr, ET. al., and unassigned describes a runway/taxiway system comprising a synthetic covering securely installed to an anchor positioned against but not attached to a runway/taxiway so that an edge of the covering is adjacent to an edge of the runway/taxiway and a growth retarding base placed beneath the synthetic covering and along a second side of the anchor with the base holding the anchor against the runway/taxiway.

U.S. Pat. No. 5,288,163 to Munson, William D, and unassigned describes a method for identifying airport taxiways and taxiway intersections by indicia a first taxiway with a continuous elongated row of first indicia identifying the first taxiway and indicia the first taxiway with a continuous elongated row of second indicia identifying an intersection with a runway or second taxiway beginning at least 100 feet in advance of the intersection. The spacing between the second indicia decreases with proximity to the intersection indicia the intersection along the route to be traversed between the first taxiway and the runway of second taxiway with a row of second indicia and indicia the runway or second taxiway with a row of second indicia after the intersection. The spacing between the second indicia increases with proximity to the intersection and said row of second indicia extends substantially along the centerline of the runway or second taxiway.

U.S. Patent Application No. 2003/0070579A1 (abandoned) to Hong, et. al., and unassigned describes a pavement indicia construction comprising a flexible layer with top and bottom surfaces. The top surface of the flexible layer is adapted for vehicular and pedestrian traffic with the flexible layer comprising at least one thermoplastic elastomer, at least one resin and a wax. The resin is substantially miscible with the thermoplastic elastomer upon cooling from a molten state and an adhesive lower layer adjacent the bottom surface of the flexible layer is adapted to adhere the flexible layer to a pavement surface.

WIPO Publication No. WO9828372A1 to Rogers, Barry Heith, and unassigned describes an indicia composition comprising a binder component and a reflective component comprising thin sheets or pieces of material which are essentially reflective.

Japanese Publication No. JP11209909A2 to Fikute, et. al., and assigned to Port & Harbour Res Inst Ministry of Transport describes a paving structure for paving an airport and its construction method which is excellent in torsion resistance, and dispenses with the provision of a joint and heating in the case of execution. A room temperature asphalt mixture including an aggregate, an asphalt emulsion mixed with the aggregate in a state where a volume is increased by bubbling and a hydraulic setting inorganic material is paved, and after paving, a thermoplastic high-molecular polymer is supplied on the room temperature asphalt mixture and rollingly pressed to form a surface layer integrated with the paved room temperature asphalt mixture. Thus, a paving structure for paving an airport constructed in this way can be provided.

SUMMARY OF THE INVENTION

"AirMark" is an airport runway signage device that comprises an alkyd resin-based preformed thermoplastic which may be laid out in 90'×120' sections onto airport runways. The "AirMark" may also be initially rolled and then melted onto the runway surface using an 8' wide IR heater. Hand held propane torches may also be used, such as the Flint 2000EX, available from Flint Trading, Inc. The material thickness of this runway signage is nominally 0.060". The signage backing is relatively thin and flexible and utilizes a low viscosity (1-300 cP) polyurea epoxy primer [available from ChemCo Systems] to seal concrete.

An embodiment of the disclosure is an alkyd resin-based pre-manufactured thermoplastic airport runway signage that is laid out in relatively large sections onto an airport runway. The preformed thermoplastic is initially formed as a continuous sheet and wound onto a take-up spool. The runway surface is prepared with [a CCS] *an* epoxy primer and the preformed thermoplastic is unwound from the take-up spool and positioned onto the runway surface. When the preformed thermoplastic signage is in a desired location it is initially rolled conforming to the runway surface. Heat is applied to the rolled surface to a temperature of or about 400° F. degrees. Fusing with a wide infra-red (IR) heater to melt the preformed thermoplastic signage into the runway surface allows for adhering the preformed thermoplastic signage to the runway surface.

In an additional embodiment the pre-manufactured thermoplastic signage is flexible and the material thickness is in a range of 0.050 inches-0.075 inches with a nominal thickness of 0.060".

Additionally the pre-manufactured thermoplastic signage that is manufactured may be shipped as 90 foot×120 foot sections composed of individual 3 foot×2 foot sheets of material.

Another embodiment includes the ability of the large pre-manufactured thermoplastic signage to be installed quickly and easily to concrete or asphalt surfaces.

In another embodiment the pre-manufactured thermoplastic signage may also be applied to fresh asphalt surfaces as soon as the asphalt has cured to a "set".

An additional embodiment includes the fact that the pre-manufactured thermoplastic signage may have features such as indents, bumps or marks that are visible indicators such that correct adhesion temperature are attained by the infra-red or other heating means used by those skilled in the art.

In an additional embodiment, the pre-manufactured thermoplastic signage is an alkyd thermoplastic product with the addition of an aliphatic polyether based polyurethane composition for flexibility and impact resistance.

In another embodiment the pre-manufactured thermoplastic signage is prepared to meet specific lengths and widths conforming with FAA Standards AC 150/5340-1 "Standards for Airport Indicia" and AC 150/5340-18 "Standards for Airport Sign Systems" for touchdown indicia, threshold indicia configurations, aiming point indicia and centerlines, as requirements for precision instrument runways.

In yet another embodiment the pre-manufactured thermoplastic signage is provided as alphanumeric symbols for specific information signage that is applied to the runway, taxiway or holding surface.

In another embodiment the pre-manufactured thermoplastic signage is available in various colors or hues.

In another embodiment the pre-manufactured thermoplastic signage has features that allow the edges to physically interconnect and interlock.

In yet another embodiment the pre-manufactured thermoplastic signage is constructed with skid resistant materials for high skid resistance and additional safety.

An embodiment of the disclosure is that the pre-manufactured thermoplastic signage is available for traffic within minutes of adhering the specific signage.

Additionally as another embodiment, the pre-manufactured thermoplastic signage identifies areas for aircraft support vehicles or outdoor passenger loading in non-runway areas.

An additional embodiment for the pre-manufactured thermoplastic signage identifies specific helicopter landing and takeoff areas including medical transport.

BRIEF DESCRIPTION OF THE DRAWINGS

FIG. 1 is an isometric cross section of the pre-manufactured thermoplastic signage with optional temperature indicating features.

DETAILED DESCRIPTION OF THE DRAWINGS

FIG. 1 is an isometric cross section of the thermoplastic signage [100] with temperature indicating feature such as, but not limited to, an indent [110], a dimple [120] or a bump [130] or any other heat deformable marker that visibly deforms when heating elevates the temperature of the thermoplastic signage [100] to a desired temperature. When the desired temperature is reached the temperature indicating feature [110, 120, 130] visibly reforms becoming a blended surface according to the traffic surface shape to which it applied. Adhesive [140] is relatively thin and flexible and utilizes a low viscosity (1-300 cP) polyurea epoxy primer [available from ChemCo Systems].

What is claimed is:

1. A pre-manufactured thermoplastic signage for application to large aviation substrates comprising: an alkyd resin-based composite including, reflective materials, and friction materials wherein said large substrates include a bottom surface and a top surface and edges that surround the perimeter of and are attached to said bottom surface and said top surface, wherein said bottom surface is covered with a [CCS] polyurea epoxy primer treatment said primer treatment provided within a viscosity range of between 1 and 300 centipoise, wherein said top surface provides an area for surface indicia materials existing on said top surface, wherein said resin-based composite is formed as a continuous sheet wound onto a take-up spool: and wherein said resin-based composite is subsequently unwound and positioned to conform to said large substrates and subsequently said signage is heated to a predetermined temperature providing optimal adhesion of said resin-based composite to said large substrate; and wherein said signage includes features that allow said edges of said signage to physically interconnect and interlock with edges of other signage with the same or other features allowing said continuous sheet to be wound or unwound from spools for specific transportation and site placement.

2. The thermoplastic signage of claim 1, wherein said spool is subsequently unwound such that said signage is rolled and positioned to conform to said large substrates.

3. The thermoplastic signage of claim 1, wherein said signage is provided in sheets rather than spooled thereby providing smaller substrate sections that are shipped in boxes for convenience during installation.

4. The thermoplastic signage as in claim 1, wherein said large substrates include concrete or asphalt.

5. The thermoplastic signage as in claim 1, wherein said large substrates are a runway, taxiway, holding position or other airport surfaces.

6. The thermoplastic signage as in claim 1, wherein said resin-based composite is flexible and conformal, and said composite is present in a thickness range of about 0.050 inches to about 0.075 inches.

7. The thermoplastic signage as in claim 1, wherein said resin-based composite is 0.060 inches thick, flexible and conformal to substrate surfaces.

8. The thermoplastic signage as in claim 1, wherein said resin-based composite and associated indicia is applied to fresh asphalt immediately after curing.

9. The thermoplastic signage as in claim 1, wherein said resin-based composite is heated to said predetermined temperature using infra-red heaters or other heating devices and techniques necessary to achieve said predetermined temperature to ensure precision application and bonding of said thermoplastic signage with said aviation substrates.

10. The thermoplastic signage as in claim 1, where said resin-based composite is an alkyd-based thermoplastic composition with the addition of an aliphatic polyether based polyurethane composition that imparts flexibility and impact resistance to the solid sheet form of said thermoplastic signage.

11. The thermoplastic signage as in claim 1, wherein said resin-based composite is cut to specific lengths and widths conforming with FAA Standards AC 150/53404-1 and AC 150/5340-18 included for touchdown indicia, threshold indicia configurations, aiming point indicia, and centerlines for precision instrument runways.

12. The thermoplastic signage as in claim 1, wherein said signage includes an alphanumeric symbol on said area for surface indicia materials existing on said top surface.

13. The thermoplastic signage as in claim 1, wherein said resin-based compositions and signage is comprised of various colors and hue(s) integral and permanently molded in the resin-based composition.

14. The thermoplastic signage as in claim 1, wherein said large surfaces of said signage is trafficked within minutes after adhering said signage to any suitable aviation associated substrate.

15. The thermoplastic signage as in claim 1, wherein said signage displays specific helicopter landing and takeoff indicia including medical transport indicia.

16. The thermoplastic signage as in claim 1, wherein said predetermined temperature to ensure proper and optimal adhesion between said signage and any suitable aviation associated substrate is about 400 degrees Fahrenheit.

17. A method for adhering large surfaces of thermoplastic signage to a suitable aviation substrate comprising an alkyd resin-based composite including, reflective materials, and friction materials wherein said large substrates include a bottom surface and a top surface and edges that surround the perimeter of and are attached to said bottom surface and said top surface, wherein said bottom surface is covered with a [CCS] polyurea epoxy primer treatment said primer treatment provided within a viscosity range of between 1 and 300 centipoise, wherein said top surface provides an area for surface indicia materials existing on said top surface, wherein said resin-based composite is formed as a continuous sheet wound onto a take-up spool; and wherein said resin-based composite is subsequently unwound and positioned to conform to said large substrates and subsequently said signage is heated to a predetermined temperature providing optimal adhesion of said resin-based composite to said large substrate; and wherein said signage includes features that allow said edges of said signage to physically interconnect and interlock with edges of other signage with the same or other features allowing said continuous sheet to be wound or unwound from spools for transportation and site placement.

* * * * *